United States Patent [19]

Naito et al.

[11] 4,349,329
[45] Sep. 14, 1982

[54] EXTRUSION DEVICE FOR PRODUCING HONEYCOMB STRUCTURES

[75] Inventors: Junichiro Naito, Toyokawa; Shinichi Yamamoto, Takahama; Jitsuo Suzuki, Aichi; Mitsuru Asano, Okazaki, all of Japan

[73] Assignee: Nippon Soken, Inc., Nishio, Japan

[21] Appl. No.: 222,068

[22] Filed: Jan. 2, 1981

[30] Foreign Application Priority Data

Jan. 22, 1980 [JP] Japan .................................. 55-6489

[51] Int. Cl.$^3$ .......................... B29F 3/04; B29D 7/04
[52] U.S. Cl. ................................ 425/461; 264/177 R; 425/380; 425/465; 425/467
[58] Field of Search .............. 425/467, 465, 461, 380, 425/197–199; 264/177 R; 428/116

[56] References Cited

U.S. PATENT DOCUMENTS

| | | | |
|---|---|---|---|
| 3,905,743 | 9/1975 | Bagley | 425/464 |
| 3,919,384 | 11/1975 | Cantaloupe et al. | 264/177 R |
| 3,947,214 | 3/1976 | Cunningham | 425/467 |
| 3,983,283 | 9/1976 | Bagley | 264/177 R |
| 4,008,033 | 2/1977 | Folmar et al. | 425/467 |
| 4,168,944 | 9/1979 | Morikawa et al. | 425/464 |
| 4,178,145 | 12/1979 | Hamamoto et al. | 425/199 |
| 4,233,351 | 11/1980 | Okumura et al. | 428/116 |
| 4,278,412 | 7/1981 | Ozaki et al. | 425/462 |

*Primary Examiner*—Jeffery R. Thurlow
*Attorney, Agent, or Firm*—Cushman, Darby & Cushman

[57] ABSTRACT

An extrusion device comprises a die provided with disconnected feed passageways and interconnected grid-shaped extrusion slots and a die mask which covers the outer peripheral portion of the die on the extrudable material outlet side through a pooling zone. The width of the uncovered grid shaped extrusion slots along the die mask is made larger on the extrudable material outlet side compared with that on the extrudable material inlet side. The extrudable material is supplied from the covered extrusion slots into the uncovered extrusion slots through the pooling zone.

8 Claims, 9 Drawing Figures

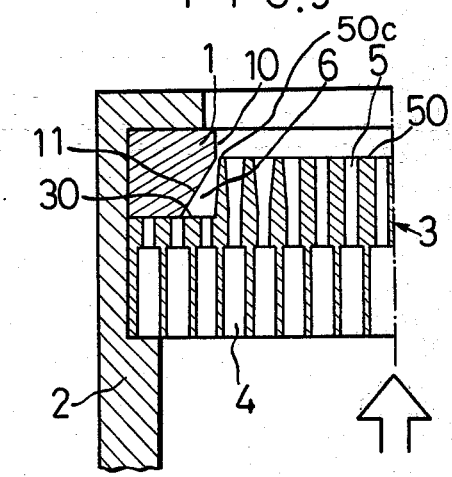
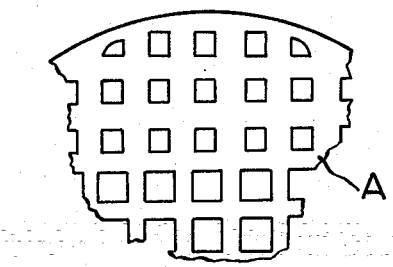
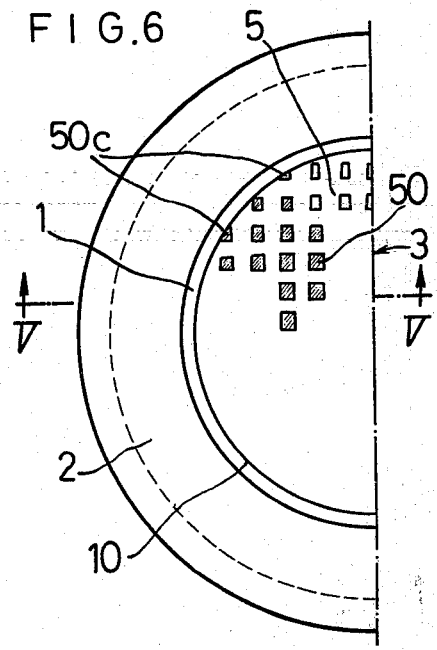

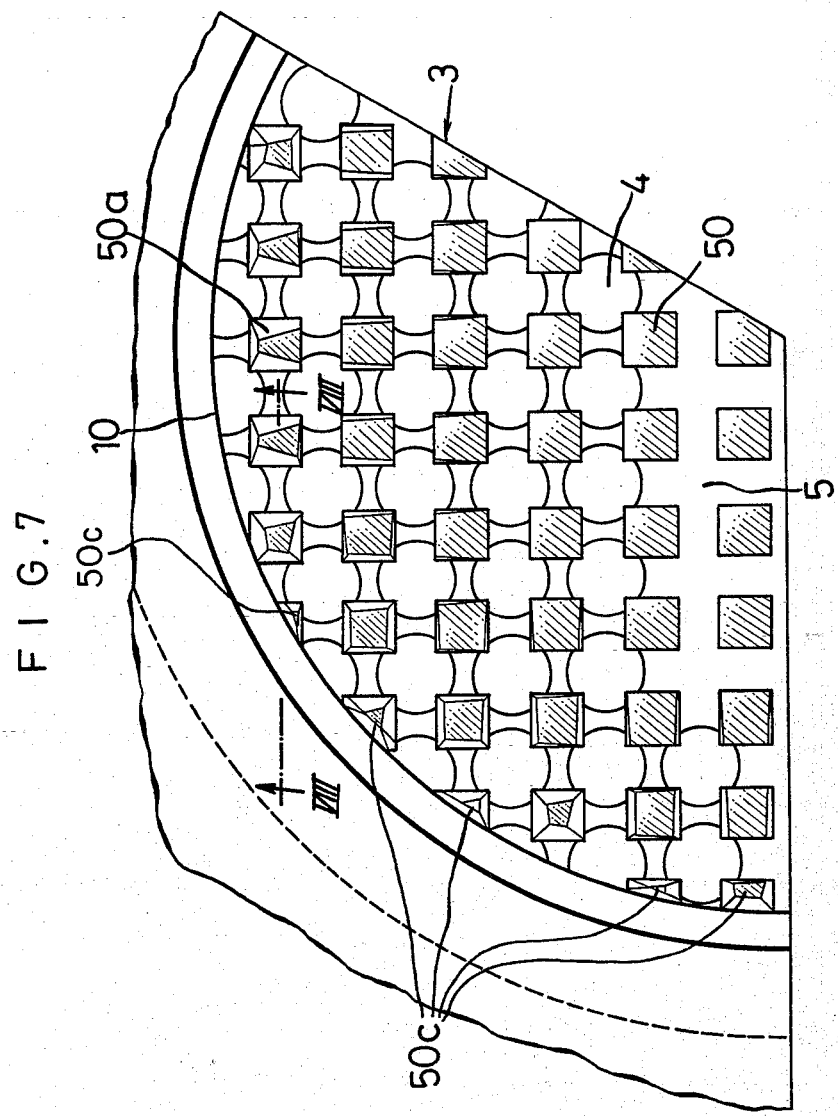

EXTRUSION DEVICE FOR PRODUCING HONEYCOMB STRUCTURES

BACKGROUND OF THE INVENTION

The present invention relates to a device for extruding honeycomb structures which are used as catalyst supports, heat exchangers or filters.

Conventionally, the mechanical strength of the whole of the ceramic honeycomb structure or of the outer peripheral portion thereof has been improved by forming an outer wall B which is thicker than a grid-shaped wall A, in the outer periphery of the honeycomb structure as shown in FIG. 1.

For extruding such a honeycomb structure as described above, devices such as one shown in FIG. 2 are conventionally used.

The conventional device is provided with a die mask 1 having an inner surface 10 of a smaller diameter than an extrusion die 3, in the outer periphery of the outlet side of the extrusion die 3 disposed within a cylinder 2 respectively.

The extrudable material which was supplied from the cylinder 2 passes feed passageways 4 and grid-shaped extrusion slots 5 which are formed within the die 3, under pressure to be extruded therefrom.

Then, the extruded body is formed by the inner wall 10 of the die mask 1 into a predetermined outer form and the thick outer wall is also formed.

However, according to the device of FIG. 2, the material is pressed by the tapered inner wall 10 of the die mask 1 toward the center thereof after being extruded out of the die 3. Therefore, distortion is easy to occur in the connecting portion C between the grid-shaped wall A and the outer wall B of the obtained honeycomb structure as shown in FIG. 3. As a result, the mechanical strength of the connecting portion C is decreased.

Furthermore, since the thickness of the outer wall of the honeycomb structure is largely different from that of the grid-shaped wall thereof, the heat transfer from the grid-shaped wall portion into the outer wall becomes discontinuous in the connecting portion therebetween, or the inclination of the heat transfer abruptly changes therein when the conventional honeycomb structure is used in the exhaust gas purifying device of an automobile. As a result, the honeycomb structure is easy to be broken in the connecting portion.

These drawbacks of the honeycomb structure are inevitable when it is extruded by the device shown in FIG. 2. And these drawbacks are caused by the defects of the conventional extrusion device itself.

There has previously been proposed one honeycomb structure in which the wall thickness is increased continuously or by stages from the central portion to the outer peripheral portion thereof in U.S. Pat. No. 4,233,351 assigned to the assignee hereof by inventors Okumura et al.

In this patented honeycomb structure, by gradually increasing the wall thickness thereof in the direction of the outer periphery thereof, thermal inclination becomes gentle and excellent thermal shock resistance can be obtained. And since the wall thickness of the outer peripheral portion is large, excellent mechanical strength can be obtained.

When the honeycomb structure is used as a catalyst support to be disposed in the exhaust system of a vehicle, the honeycomb structure is retained within a casing. In this case, it is required to maintain air-tight condition good between the outer peripheral surface of the honeycomb structure and the inner surface of the casing in order that the exhaust gas does not leak therethrough. Therefore, it is desired to make the outer peripheral surface of the honeycomb structure smooth.

Accordingly, one object of the present invention is to provide an extrusion device for producing honeycomb structures having an excellent mechanical strength and thermal shock resistance.

Another object of the present invention is to provide an extrusion device for producing honeycomb structures of which wall thickness is increased from the central portion toward the outer peripheral portion thereof with uniform density without generating any distortion in the wall thereof.

Still another object of the present invention is to provide an extrusion device for producing honeycomb structures having smooth outer peripheral surfaces.

DESCRIPTION OF THE DRAWINGS

Other objects and advantages of the invention will become apparent from the following description of embodiments with reference to the accompanying drawings, wherein:

FIG. 4 is a schematic plan view of a honeycomb structure which was produced by the extrusion device of the present invention;

FIG. 5 is a longitudinally sectional view of a half of a device of an embodiment of the present invention, taken along the line V—V of FIG. 6;

FIG. 6 is a plan view of a half of the device of the embodiment;

FIG. 7 is a partially enlarged plane view of FIG. 6;

SUMMARY OF THE INVENTION

Figure 1:
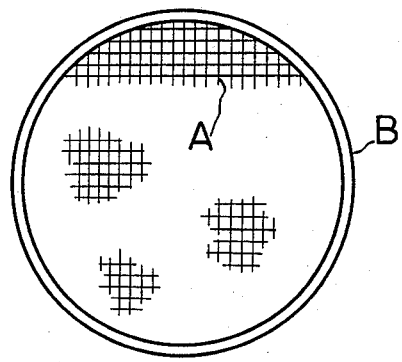
FIG. 1 is a schematic plane view of a conventional honeycomb structure.

An extrusion device of the present invention comprises a die provided with feed passageways and grid-shaped extrusion slots of which width is made larger on the extrudable material outlet side compared with that on the extrudable material inlet side in the outer peripheral portion of the die, and a die mask which is disposed so as to be opposed to the outer peripheral end surface of the die through a gap which is communicated with the extrusion slots of the outer peripheral portion of the die for supplying the extrudable material which is stocked in the gap to the extrusion slots of the outer peripheral portion.

DETAILED DESCRIPTION OF THE INVENTION

Hereinafter, the present invention will be explained in accordance with embodiments with reference to the drawings.

In an embodiment shown in FIG. 5 to FIG. 8, a die 3 having a circular outer form is fixed between a cylinder 2 and a die mask 1 which is disposed on the extrudable material outlet side of the die 3.

The die 3 is provided with a large number of disconnected circular feed passageways 4 on the extrudable material inlet side thereof and interconnected grid-shaped extrusion slots 5 on the extrudable material outlet side thereof. And the feed passageways 4 and the extrusion slots 5 are communicated with each other in the axially central portion of the die 3.

The die mask 1 has an annular form and is closely fit in a stepped portion 30 formed in the outer peripheral portion of the die 3.

By the inner surface 10 of the die mask 1, the outer shape of the honeycomb structure which was extruded out of the extrusion slots 5 is formed.

The die mask 1 is provided with an inclined surface 11 in its inner peripheral portion along the whole circumference thereof. And between the inclined surface 11 and the die 3, a gap (hereinafter called extrudable material pooling zone) 6 having a triangular section is formed.

In three extrusion slots of the outer peripheral portion surrounded by the inner surface 10 of the die mask 1, the opening portion thereof on the extrudable material outlet side are gradually enlarged.

Figure 8:
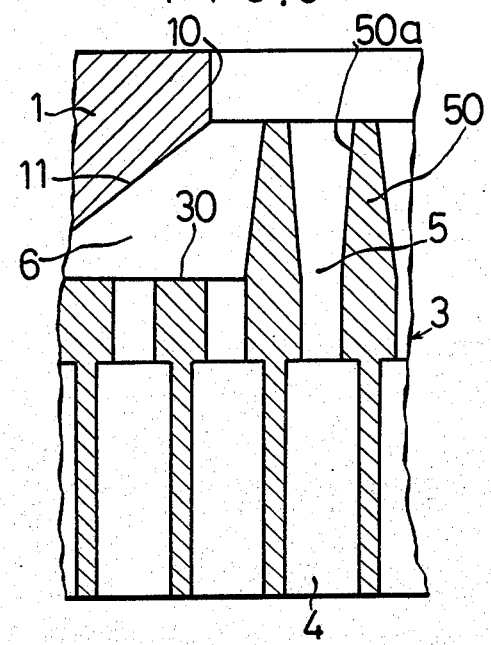
FIG. 8 is a longitudinally sectional view taken along the line VIII—VIII of FIG. 7.

As shown in FIGS. 7 and 8, the die 3 is provided with a large number of disconnected circular feed passageways 4 having an equal cross sectional area respectively, which are formed at predetermined intervals from the extrudable material inlet side thereof.

The grid-shaped interconnected extrusion slots 5 have an equal width to each other in the connecting portion with the feed passageways 4. And the wall portion 50 have nearly square cross sections respectively therein.

The cross sectional area of each wall portion 50 is decreased toward the opening end thereof and the side surfaces 50a of the wall portion 50 are tapered respectively.

The tapering angle of the side surfaces 50a becomes gradually larger toward the outer wall portion of the die 3, so that the width of the extrusion slots is continuously increased theretoward.

The tapered side surfaces 50a are formed by a cutting method, a grinding method or other adequate method.

When the extrudable material such as ceramic, rubber and plastics is extruded by the extrusion device having the above described construction, the extrudable material which was supplied from the cylinder 2 under pressure, is fed into the extrusion slots 5 under pressure through the feed passageways 4 and then is extruded out of the extrusion slots 5 along the inner surface 10 of the die mask 1.

Thus, a honeycomb structure provided with grid-shaped wall and having an outer shape which is formed by the inner surface 10 of the die mask 1, as shown in FIG. 4 can be obtained. In this case, the most part of the extrudable material which is pressurized to be supplied into the feed passageways 4 of the outermost peripheral portion of the die 3 is fed to the extrudable material pooling zone 6 through the extrusion slots thereof.

Into the extrusion slots 5 positioned within the inner surface 10 of the die mask 1, the extrudable material is supplied from the feed passageways 4 which are communicated therewith. However, the extrudable material becomes short in the extrusion slots positioned in the outer peripheral portion of the die 3, of which openings are enlarged.

The shortage of the extrudable material is supplied by that which is flowed from the pooling zone 6 through the transversely extending extrusion slots 5.

Figure 3:
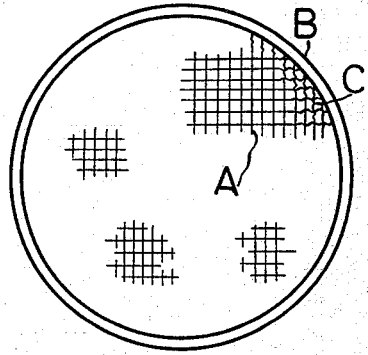
FIG. 3 is a schematic plane view of a defective honeycomb structure which was produced by the conventional extrusion device.
Figure 2:
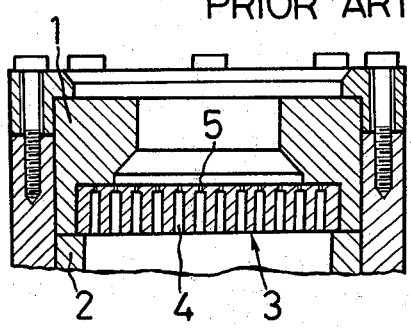
FIG. 2 is a fragmentary sectional view of the conventional extrusion device for producing honeycomb structures.

As a result, the density of the grid-shaped wall of the honeycomb structure becomes uniform from the central portion to the outer peripheral portion thereof. And such a distorted wall C as shown in FIG. 3 was not observed in the honeycomb structure which was produced by the extrusion device of the present invention.

Furthermore, since the grid-shaped wall A (FIG. 4) of the extruded honeycomb structure is formed so as to be gradually increased toward the outer wall thereof, an excellent thermal shock resistance can be obtained.

And according to the present invention, the outer surface of the obtained honeycomb structure can be made smooth.

Namely, as shown in FIG. 6 and FIG. 7, the circular inner surface 10 of the die mask 1 crosses the openings of the extrusion slots 5 positioned in the outer peripheral portion of the die 3 on the extrudable material outlet side and the end surfaces 50c of the wall portions defining the above described extrusion slots 5.

When the extrudable material is extruded out of the die 3, the extrudable material is extruded through the openings of the extrusion slots 5 crossed by the inner surface 10 of the die mask 1, too. According to the conventional devices, into the above described wall portions crossed by the inner surface of the die mask, no extrudable material is supplied so that concave portions are formed in the outer peripheral surface of the obtained honeycomb structure. As a result, the outer peripheral surface of the obtained honeycomb structure becomes rough.

In contrast, according to the present invention, into the upper portions of the end surface 50c of the wall portion crossed by the inner surface 10 of the die mask 1, the extrudable material is supplied from the pooling zone 6. Therefore, the portion along the inner surface 10 of the die mask 1 is completely filled with the extrudable material.

As a result, the outer peripheral surface of the obtained honeycomb structure becomes smooth as shown in FIG. 4.

Such a honeycomb structure which has a smooth outer periphery is very effective when it is used for such a purpose as to require good air tight condition between the case wherein the honeycomb structure is accomodated and the outer periphery of the honeycomb structure like a catalyst support which is disposed in the exhaust system of vehicles.

The extrusion slots 5 of the die of the extrusion device of the present invention can be easily formed by only cutting or grinding the openings of the extrusion slots of the conventional die.

According to the present invention, the extrusion slots may be also formed so that the width thereof is increased by stages toward the outer wall of the die.

The section of the extrudable material pooling zone is not limited to the triangle as shown in the above described embodiment. Other sectional shape is possible if the extrudable material can be stored and be supplied into the extrusion slots.

Figure 9:
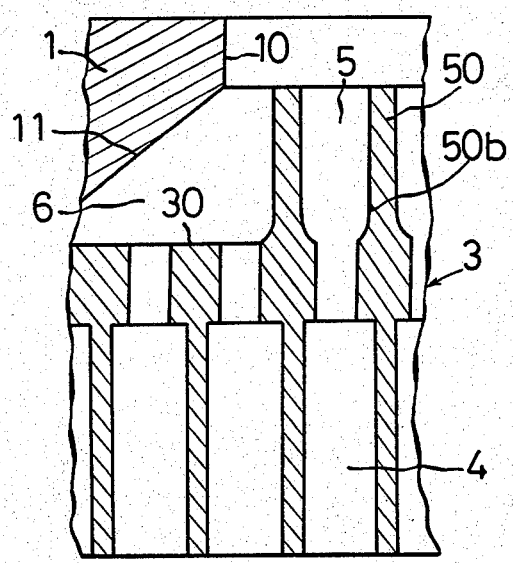
FIG. 9 is a fragmentary longitudinally sectional view of a modified embodiment of the present invention.

And the tapered side surface 50a formed in the enlarged opening of the extrusion slots can be also formed into the curved surface 50b having U-shaped section as shown in FIG. 9 or other section such as not to block the flow of the extrudable material.

Having now fully described the invention, it will be apparent to one of ordinary skill in the art that many changes and modifications can be made thereto without departing from the spirit or scope of the invention as set forth herein.

What is claimed is:

1. An extrusion device for producing honeycomb structure provided with walls of which thickness is larger in the outer peripheral portion thereof than in the central portion thereof, comprising:
   a die provided with a large number of disconnected feed passageways which are formed on an extrudable material inlet side of said die in the axial direction thereof, and having
   a large number of interconnected grid-shaped extrusion slots which are formed on an extrudable material outlet side of said die in said axial direction and communicated with said feed passageways;
   said die being further provided with a stepped portion in the outer peripheral portion thereof;
   the cross sectional area of each outlet opening of said extrusion slots positioned along the outer surface of an unstepped portion of said die being larger than that of the communicating portion thereof with each feed passageway;
   an annular die mask having one end surface covering said extrusion slots of said stepped portion of said die on said extrudable material outlet side thereof; and
   an annular pooling zone which is formed between said one end surface of said die mask and the opposed surface of said stepped portion of said die so as to surround said outer surface of said unstepped portion of said die;
   said pooling zone being communicated with said extrusion slots.

2. An extrusion device according to claim 1, wherein:
   said feed passageways have a circular cross section of an equal diameter; and
   said extrusion slots have an equal cross sectional area in the communicating portion with said feed passageways.

3. An extrusion device according to claim 1, wherein:
   the cross sectional area of each opening of said extrusion slots along said outer surface of said unstepped portion of said die on said extrudable material outlet side of said die is continuously increased outward.

4. An extrusion device according to claim 1, wherein:
   the cross sectional area of each opening of said extrusion slots along said outer surface of said unstepped portion of said die on said extrudable material outlet side of said die is increased by stages outward.

5. An extrusion device according to claim 1, wherein:
   the walls defining each of said extrusion slots along said outer surface of said unstepped portion of said die are of a tapered shape respectively so as to increase the cross sectional area of each said extrusion slots towards said opening thereof.

6. An extrusion device according to claim 1, wherein:
   the walls defining each said extrusion slots along said outer surface of said unstepped portion of said die are of a curved shape respectively so that each extrusion slot has a U-shaped section near each opening.

7. An extrusion device according to claim 1, wherein:
   said outer peripheral portion of said die is formed into a stepped portion for disposing said die mask therein; and
   the lower portion of said inner surface of said die mask is inclined outward so as to form said pooling zone into a triangular cross section.

8. An extrusion device according to claim 1, wherein:
   said pooling zone is formed by said end surface of said die mask being a tapered shape; and
   said pooling zone is communicated with the inside of said die mask through a gap formed between an outlet end of said unstepped portion of said die and the opposed surface of said die mask.

* * * * *